(12) United States Patent
Dalsgaard et al.

(10) Patent No.: US 9,706,422 B2
(45) Date of Patent: Jul. 11, 2017

(54) DATA BUFFER STATUS INFLUENCED CONTROL CHANNEL MONITORING

(71) Applicant: Nokia Technologies Oy, Espoo (FI)

(72) Inventors: Lars Dalsgaard, Oulu (FI); Elena Virtej, Espoo (FI); Petteri Lunden, Espoo (FI)

(73) Assignee: Nokia Technologies Oy, Espoo (FI)

( * ) Notice: Subject to any disclaimer, the term of this patent is extended or adjusted under 35 U.S.C. 154(b) by 192 days.

(21) Appl. No.: 14/372,362

(22) PCT Filed: Jan. 10, 2013

(86) PCT No.: PCT/FI2013/050019
§ 371 (c)(1),
(2) Date: Jul. 15, 2014

(87) PCT Pub. No.: WO2013/113986
PCT Pub. Date: Aug. 8, 2013

(65) Prior Publication Data
US 2015/0009832 A1 Jan. 8, 2015

Related U.S. Application Data

(60) Provisional application No. 61/594,757, filed on Feb. 3, 2012.

(51) Int. Cl.
*H04W 24/08* (2009.01)
*H04W 72/12* (2009.01)
*H04W 76/04* (2009.01)

(52) U.S. Cl.
CPC ....... *H04W 24/08* (2013.01); *H04W 72/1221* (2013.01); *H04W 72/1284* (2013.01); *H04W 76/048* (2013.01)

(58) Field of Classification Search
None
See application file for complete search history.

(56) References Cited

U.S. PATENT DOCUMENTS 9,125,208 B2 * 9/2015 Suzuki
2003/0045288 A1 * 3/2003 Luschi ................. H04W 52/16
455/434

(Continued)

FOREIGN PATENT DOCUMENTS

| CN | 101925000 A | 12/2010 |
| EP | 1944923 A2 | 7/2008 |

(Continued)

OTHER PUBLICATIONS

International Search Report and Written Opinion received for corresponding Patent Cooperation Treaty Application No. PCT/FI2013/050019, dated Apr. 18, 2013, 14 pages.

(Continued)

*Primary Examiner* — Jeffrey M Rutkowski
*Assistant Examiner* — Jonathan B Wood
(74) *Attorney, Agent, or Firm* — Harrington & Smith (57) ABSTRACT

The monitoring of control channels, such as the physical downlink control channel, may benefit from the influence of data buffer status information. In certain embodiments, a method includes monitoring a downlink channel (for example, a PDCCH) in active time. The method also includes monitoring an instantaneous status of a data buffer related to a user equipment and/or a base station. The monitoring of the downlink channel is guided by the instantaneous status as presently known.

20 Claims, 7 Drawing Sheets

(56) References Cited

U.S. PATENT DOCUMENTS

| | | | |
|---|---|---|---|
| 2003/0179720 A1* | 9/2003 | Cuny | H04L 47/14 370/310 |
| 2005/0078651 A1* | 4/2005 | Lee | H04L 47/10 370/349 |
| 2005/0265279 A1* | 12/2005 | Markovic | H04W 76/021 370/328 |
| 2007/0133479 A1* | 6/2007 | Montojo | H04W 52/0216 370/335 |
| 2007/0217389 A1* | 9/2007 | Seo | H04L 47/10 370/349 |
| 2008/0198795 A1* | 8/2008 | Kim | H04W 76/048 370/328 |
| 2009/0147726 A1* | 6/2009 | Tseng | H04L 1/1822 370/315 |
| 2009/0207794 A1* | 8/2009 | Meylan | H04W 76/048 370/329 |
| 2009/0325506 A1* | 12/2009 | Nibe | H04L 1/0002 455/67.13 |
| 2010/0070816 A1* | 3/2010 | Park | H04L 1/1835 714/748 |
| 2010/0074206 A1* | 3/2010 | Yu | H04L 1/00 370/329 |
| 2010/0130219 A1* | 5/2010 | Cave | H04W 72/02 455/450 |
| 2010/0220601 A1* | 9/2010 | Vermani | H04W 28/04 370/248 |
| 2010/0302946 A1* | 12/2010 | Yang | H04B 7/155 370/235 |
| 2011/0026625 A1* | 2/2011 | Susitaival | H04W 52/0251 375/260 |
| 2011/0059745 A1* | 3/2011 | Yi | H04W 24/08 455/452.2 |
| 2011/0134875 A1* | 6/2011 | Ding | H04B 7/024 370/329 |
| 2011/0164500 A1* | 7/2011 | Blomstergren | H04L 47/10 370/235 |
| 2011/0261747 A1* | 10/2011 | Wang | H04B 7/155 370/315 |
| 2011/0268087 A1* | 11/2011 | Kwon | H04L 5/0005 370/331 |
| 2012/0014269 A1* | 1/2012 | Ray | H04W 74/006 370/252 |
| 2012/0033561 A1* | 2/2012 | Kawamura | H04J 13/14 370/252 |
| 2012/0076104 A1* | 3/2012 | Chun | H04W 72/042 370/329 |
| 2012/0093118 A1* | 4/2012 | Peters | H04L 1/0081 370/329 |
| 2012/0207025 A1* | 8/2012 | Barbieri | H04L 1/20 370/236 |
| 2013/0028221 A1* | 1/2013 | Seo | H04W 72/042 370/329 |
| 2013/0051254 A1* | 2/2013 | Wilhelmsson | H04W 72/1215 370/252 |
| 2014/0105164 A1* | 4/2014 | Moulsley | H04W 72/042 370/329 |
| 2014/0334371 A1* | 11/2014 | Kim | H04W 52/0206 370/311 |

FOREIGN PATENT DOCUMENTS

| | | |
|---|---|---|
| EP | 2268078 A1 | 12/2010 |
| EP | 2391180 A1 | 11/2011 |
| WO | 2006/114710 A2 | 11/2006 |
| WO | 2008/024889 A2 | 2/2008 |
| WO | 2013006339 | 1/2013 |

OTHER PUBLICATIONS

Liu et al., "Multi-User and Channel Dependent Scheduling Based Adaptive Power Saving for LTE and Beyond System", 16th Asia-Pacific Conference on Communications (APCC), Oct. 31-Nov. 3, 2010, pp. 118-122.

Kolding et al., "Balancing Power Saving and Single User Experience with Discontinuous Reception in LTE", IEEE International Symposium on Wireless Communication Systems, Oct. 21-24, 2008, pp. 713-717.

Yang et al., "Adaptive Discontinuous Reception Mechanism for Power Saving in UMTS", IEEE Communications Letters, vol. 11, Issue 1, Jan. 2007, pp. 40-42.

Extended European Search Report received for corresponding European Patent Application No. 13743147.4, dated Sep. 2, 2015, 9 pages.

* cited by examiner

DATA BUFFER STATUS INFLUENCED CONTROL CHANNEL MONITORING

RELATED APPLICATION

This application was originally filed as PCT application Ser. No. PCT/FI2013/050019filed Jan. 10, 2013, which claims priority benefit from U.S. application Ser. No. 61/594757, filed Feb. 3, 2012.

BACKGROUND

Field:

The monitoring of control channels, such as the physical downlink control channel, may benefit from the influence of data buffer status information. Thus, certain embodiments may broadly apply to communication systems, such as communication systems associated with the third generation partnership project (3GPP). Certain embodiments more particularly may be relevant to evolved universal terrestrial radio access network (E-UTRAN) connected mode data transmission, user equipment (UE) power consumption and the combined method of handling the unpredictable data traffic patterns for handheld smart devices, taking into account user equipment power consumption.

Description of the Related Art:

Data traffic flow in mobile networks is significant and growing. Smart phones and other smart devices, which may be online more or less all the time potentially with multiple applications running in parallel, may add to the data traffic.

Radio resource control (RRC) connected mode discontinuous reception (DRX) is a method for providing power saving for devices in connected mode.

Connected mode DRX can be controlled and configured by the network, for example, by a network element such as an access point, base station or e-Node B (eNB) based on network knowledge. The network does not conventionally have a way to retrieve detailed user equipment (UE) information concerning the active applications. Also changes in the DRX configuration due to changes in the instant data traffic needs may require signaling a new RRCConnectionReconfiguration. Conventionally, when there is only low/no data flow, the optimum DRX configuration would for example be very short on-duration and very short inactivity timer. On the other hand a DRX configuration for when active flow is present could, for example, be longer on-duration and/or longer inactivity timer for allowing scheduler freedom and allow for changing radio conditions.

SUMMARY

According to a first embodiment, a method includes monitoring a downlink channel (for example, a PDCCH) in active time or connected mode. The method also includes monitoring an instantaneous status of data buffers related to a user equipment and/or a base station. The monitoring of the downlink channel is guided by the instantaneous status as presently known.

According to a second embodiment, a method includes signaling an instantaneous status of a user equipment data buffer to a network device and/or a data buffer of a network device to a user equipment. The instantaneous status is configured to permit the network device to determine monitoring of a downlink channel (for example, a PDCCH) in active time guided by the instantaneous status as presently known.

In third and fourth embodiments, a non-transitory computer readable medium is encoded with instructions that, when executed in hardware, perform a process. The process can include the methods of the first and second embodiments.

According to a fifth embodiment, an apparatus includes at least one processor; and at least one memory including computer program code. The at least one memory and computer program code are configured to, with the at least one processor, cause the apparatus at least to monitor a downlink channel (for example, a PDCCH) in active time. The at least one memory and computer program code are also configured to, with the at least one processor, cause the apparatus at least to monitor an instantaneous status of a data buffer related to a user equipment. Monitoring of the downlink channel is guided by the instantaneous status as presently known.

In a sixth embodiment, an apparatus includes at least one processor and at least one memory including computer program code. The at least one memory and computer program code are configured to, with the at least one processor, cause the apparatus at least to signal an instantaneous status of a user equipment data buffer to a network device. The instantaneous status is configured to permit the network device to determine monitoring of a downlink channel in active time guided by the instantaneous status as presently known.

An apparatus, according to a seventh embodiment, includes monitoring means for monitoring a downlink channel (for example, a PDCCH) in active time. The apparatus also includes monitoring means for monitoring an instantaneous status of a data buffer related to a user equipment. The monitoring of the downlink channel is guided by the instantaneous status as presently known.

An apparatus, according to an eighth embodiment, includes signaling means for signaling an instantaneous status of a user equipment data buffer to a network device. The instantaneous status is configured to permit the network device to determine monitoring of a downlink channel in active time guided by the instantaneous status as presently known.

In a ninth embodiment, a system includes a first apparatus comprising monitoring means for monitoring a downlink channel in active time and monitoring means for monitoring an instantaneous status of a data buffer related to a user equipment, wherein the monitoring of the downlink channel is guided by the instantaneous status as presently known. The system also includes a second apparatus comprising signaling means for signaling the instantaneous status of the user equipment data buffer to a network device, wherein the instantaneous status is configured to permit the network device to determine monitoring of the downlink channel in active time guided by the instantaneous status as presently known.

BRIEF DESCRIPTION OF THE DRAWINGS

For proper understanding of the invention, reference should be made to the accompanying drawings, wherein.

DETAILED DESCRIPTION

New applications and associated data traffic patterns may be unpredictable. Thus, a system according to certain embodiments can provide enough flexibility to cover both the needs from a network resource scheduler point of view as well as from the user equipment, in terms of a need to cease monitoring the physical downlink control channel (PDCCH) for allocations whenever this is possible to save power.

For example, smart devices, as well as other devices such as machine to machine (M2M) and machine type communication (MTC) devices may provide particularly unpredictable traffic patterns. Neither user equipment nor network, or even the user, may know much in advance what the needs of air interface resource are or will be. Thus, the communication needs and pattern of the future applications or data generating sources is fully open.

Certain embodiments provide a method that takes into account instant data flow needs from user equipment (UE) and/or a network element such as an access point, base station or e-Node B (eNB) and enables the immediate requirement to impact the UE active time, for example, to adjust physical downlink control channel (PDCCH) monitoring requirements. In the following discussion, eNB is used as one example of a network element, but it should be understood that it is just one example of possible network elements to which certain embodiments may be applied. For example, the two devices in communication may be a master and slave device. Thus, certain embodiments may be applicable to systems that do not involve a conventional network.

Certain embodiments, more particularly, provide a method in which physical downlink control channel monitoring rules are influenced or guided by the instant status of the data buffers in the user equipment and/or network element, such as an access point, base station, or eNode B.

The PDCCH monitoring in active time can be guided by an instantaneous status of the user equipment data buffer as presently known from the UE and signaled to eNB in a buffer status report (BSR). Similarly, the eNB buffer status can be made known also to the user equipment which then takes it into account in the PDCCH monitoring.

While either user equipment or eNB (one or both) data buffers contain data for the user equipment, the user equipment can monitor the PDCCH. When both buffers are empty the user equipment can cease the PDCCH monitoring and revert to following the DRX on-durations.

Thus, certain embodiments can avoid retrieving information from applications creating the traffic and synchronizing the needs of the applications' air interface resources. Instead, data transmission buffers, both on a user equipment side and on an eNB side can be monitored.

Data buffer information may indicate the immediate need, which directly reflects the need of the air interface resources.

If user equipment, as well as optionally the network which may set the rules, knows the buffer status, the user equipment can use the instant buffer information for adjusting the PDCCH monitoring requirements/rules. More particularly, the user equipment can know both the UE's own buffer status as well as the buffer status of the eNB. When not specified otherwise, the term "the buffer status" can include the status of both buffers.

Accordingly, certain embodiments provide a method that adapts PDCCH monitoring based on the immediate buffer status. It should be noted that PDCCH is provided merely as one example of a downlink channel.

In certain embodiments, for example, if a user equipment is already in active data transmission and sends a buffer status report, the status of the latest buffer status report can influence the PDCCH monitoring length, either the on-duration or inactivity timer length or generally the PDCCH monitoring. A buffer status report is just one example, and any other way for informing a device about queued data for transmission can be used instead of or in addition to a buffer status report. Alternatively the user equipment initiates data transmission due to data arriving in the data buffer. For example, the user equipment can send the buffer status report to the network indicating the amount of data for transmission. Also, there can be downlink (DL) 'BSR' indications which could trigger similar functionality. The 'DL BSR' can be the eNB data buffer for the user equipment indicating, for example, an amount of data buffered for scheduling. Having this information available in both user equipment and eNB can, among other things, allow for flexible inactivity-timer length or PDCCH monitoring rules or use one of a given set of timer lengths.

In one example, if a user equipment buffer status report indicates only small buffer size and an eNB buffer indicates the same, the user equipment can apply short PDCCH monitoring rules. For example, the user equipment can apply a short on-duration and/or a short inactivity timer.

On the other hand, if the buffer(s) on user equipment side and/or eNB side indicate(s) large amount of data, the large amount of data can trigger the user equipment to apply longer PDCCH monitoring rules. For example, the user equipment could apply a long inactivity timer. Furthermore, based on the instantaneous buffer status report, the user equipment can decide whether continuous PDCCH monitoring is to be performed. In another example, the user equipment monitors PDCCH continuously or using a frequent activity pattern as long as it is aware that there is data in user equipment and/or eNB buffer. And when the buffers are empty, the user equipment starts monitoring PDCCH according to a less frequent pattern.

Thus, a user equipment can apply aggressive power saving DRX rules when the amount of data is low or non-existing. Likewise, the user equipment can perform increased PDCCH monitoring when there is more data. This combination of approaches may permit flexibility without requiring frequent scheduling for re-starting an inactivity timer. For example, it may be possible to ensure longer UE PDCCH monitoring without frequent scheduling for re-starting inactivity timer even when applying a more aggressive power saving settings.

Multiple implementations of certain embodiments are possible. For example, a user equipment can be configured with more than one set of parameters and can apply a given set of parameters based on the immediate buffer status information.

Figure 1:
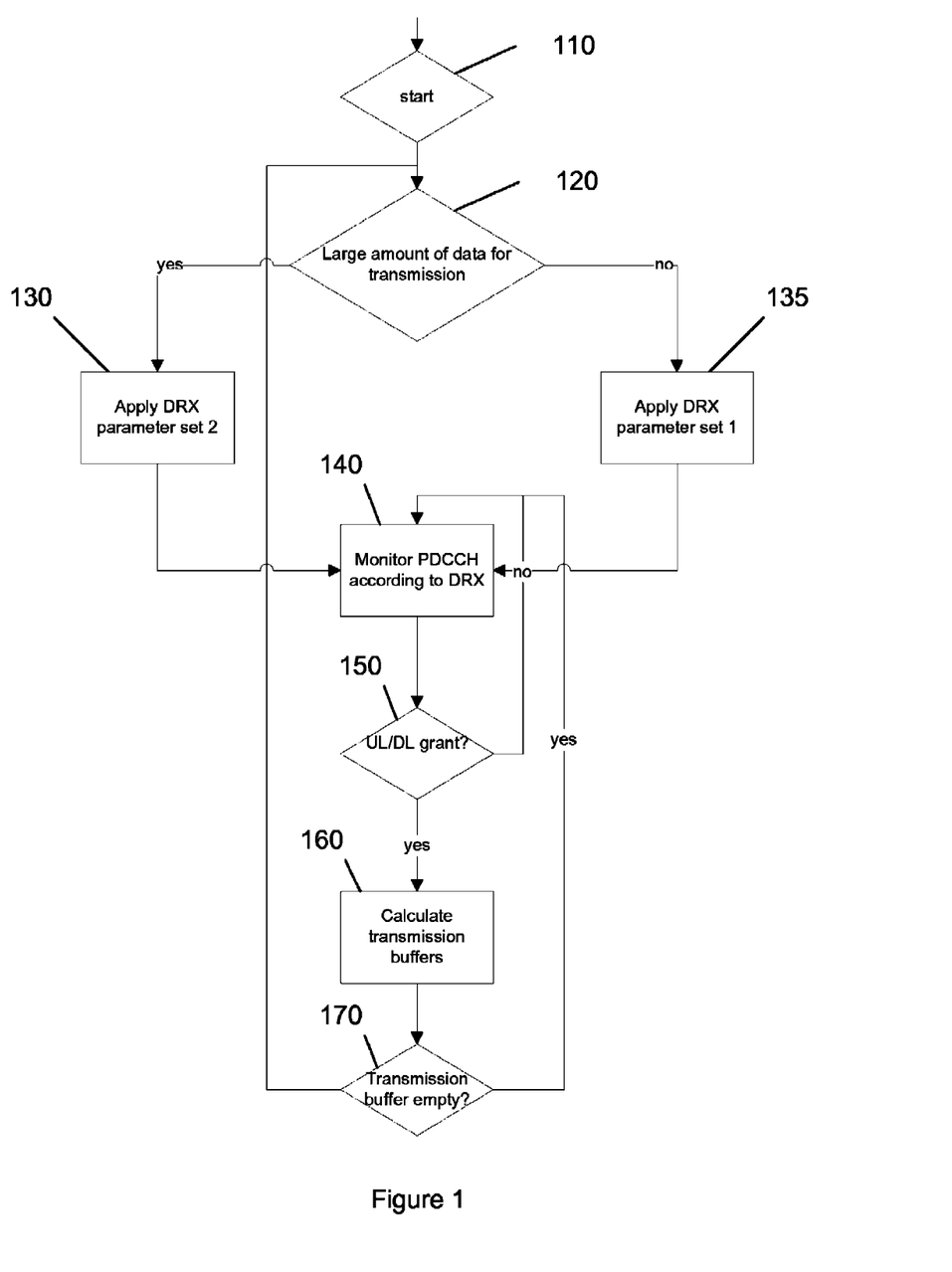
FIG. 1 illustrates a method according to certain embodiments in which one of two discontinuous reception parameter sets is used based on buffer status information.

FIG. 1 illustrates a method according to certain embodiments, in which a user equipment is provided with more than one set of parameters.

As shown in FIG. 1, the method can start 110. Then, at 120, the user equipment can determine whether there is a large amount of data for transmission. If so, then at 130, the user equipment can apply DRX parameter set 2. In contrast, if there is not a large amount of data for transmission, then at 135 the user equipment can apply DRX parameter set 1. The threshold for what is considered a large amount of data (or generally to use, for example, parameter set 2 instead of parameter set 1) can be either a fixed value or configured by the network. For example, the threshold can depend on the cell bandwidth, capacity, or load. Thus, for example, the threshold can correspond to the amount of data that is expected to be transmitted within a certain time window (for example, 1-10 seconds) of active time. In one alternative, there is a different threshold for user equipment buffer and eNB buffer, so that different DRX parameter sets are used for cases where user equipment buffer exceeds its threshold, eNB buffer exceeds its threshold, and both buffers exceed their thresholds.

Then, at 140, the user equipment can monitor the PDCCH according to the selected set of DRX parameters. At an appropriate time 150, the user equipment can determine whether there is any uplink or downlink grant. If not, the user equipment can revert to, at 140, monitoring PDCCH according to the previously selected DRX parameters, which can be the DRX parameters selected above. If there is an uplink/downlink grant, and the subsequent data transmission and/or buffer status report is successfully received then at 160 the user equipment can calculate transmission buffers. If, at 170, the transmission buffer of user equipment and/or eNB is empty, then the user equipment can revert to 140 and monitor PDCCH according to DRX parameters previously established. In this case, when the user equipment resumes monitoring PDCCH according to DRX parameters at 140, it may go directly to sleep, For example, the user equipment may go to the part of the DRX pattern, where the user equipment is not required to monitor PDCCH. Alternatively, 170 may be skipped and the user equipment can return to 120 directly after 160. Otherwise, the user equipment can return to 120 and make a decision regarding which set of DRX parameters to use.

Figure 2:
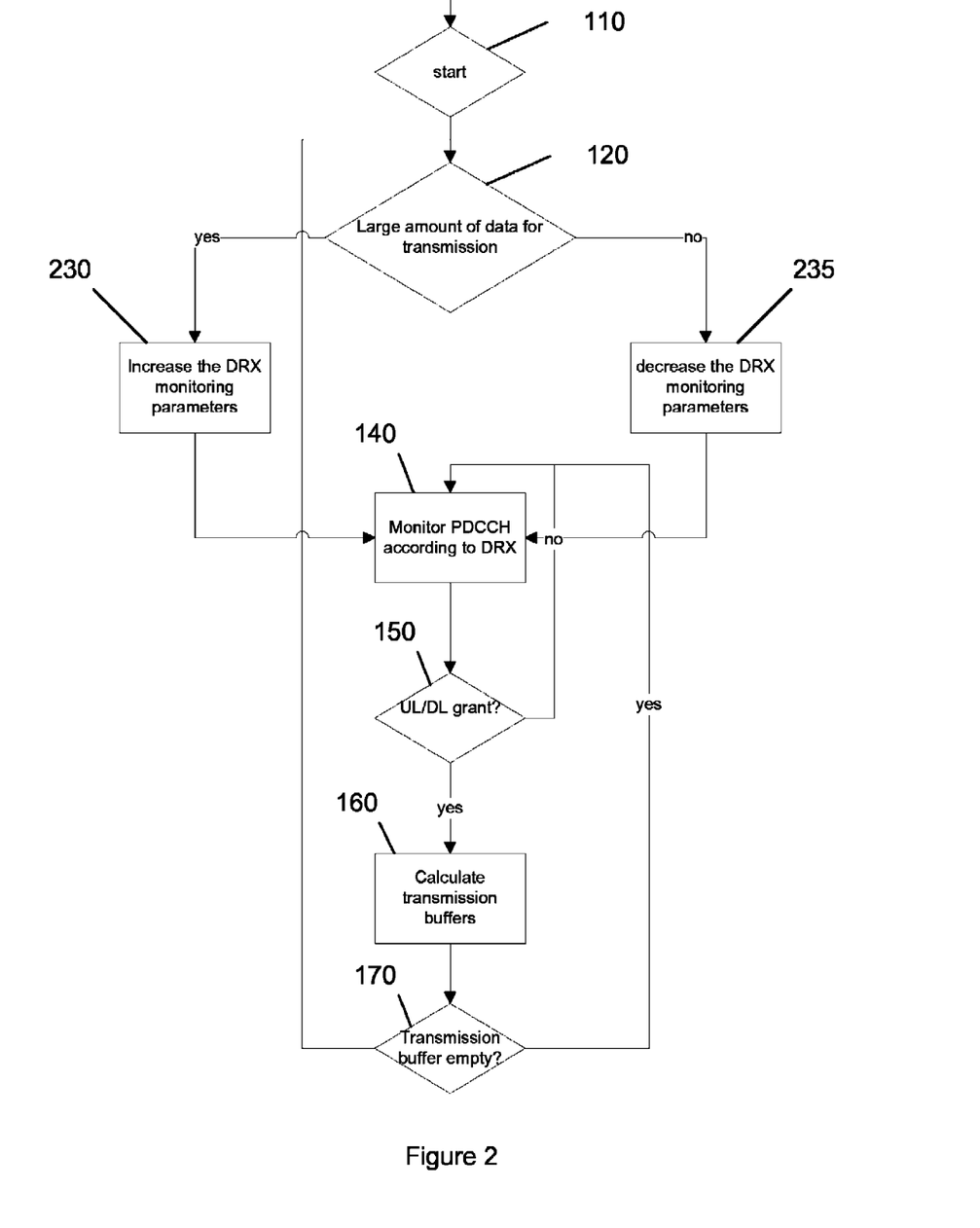
FIG. 2 illustrates a method according to certain embodiments in which a single set of discontinuous reception parameters and scaling is used.

In an alternative embodiment, the user equipment can have only one set of parameters but can scale the PDCCH monitoring parameters according to given rules based on the immediate buffer status information. The case of one set of parameters is just one embodiment, with multiple sets of parameters and scaling combined also being permitted. FIG. 2 illustrates a method according to certain embodiments, in which a user equipment is provided with scaling.

As can be seen in FIG. 2, the operation may be similar to the operation in FIG. 1. However, rather than, or in addition to, selecting different sets of parameters, at 230 if there is a large amount of data for transmission, the user equipment may increase the DRX monitoring parameters. Otherwise, at 235, the user equipment may decrease the DRX monitoring parameters.

Figure 3:
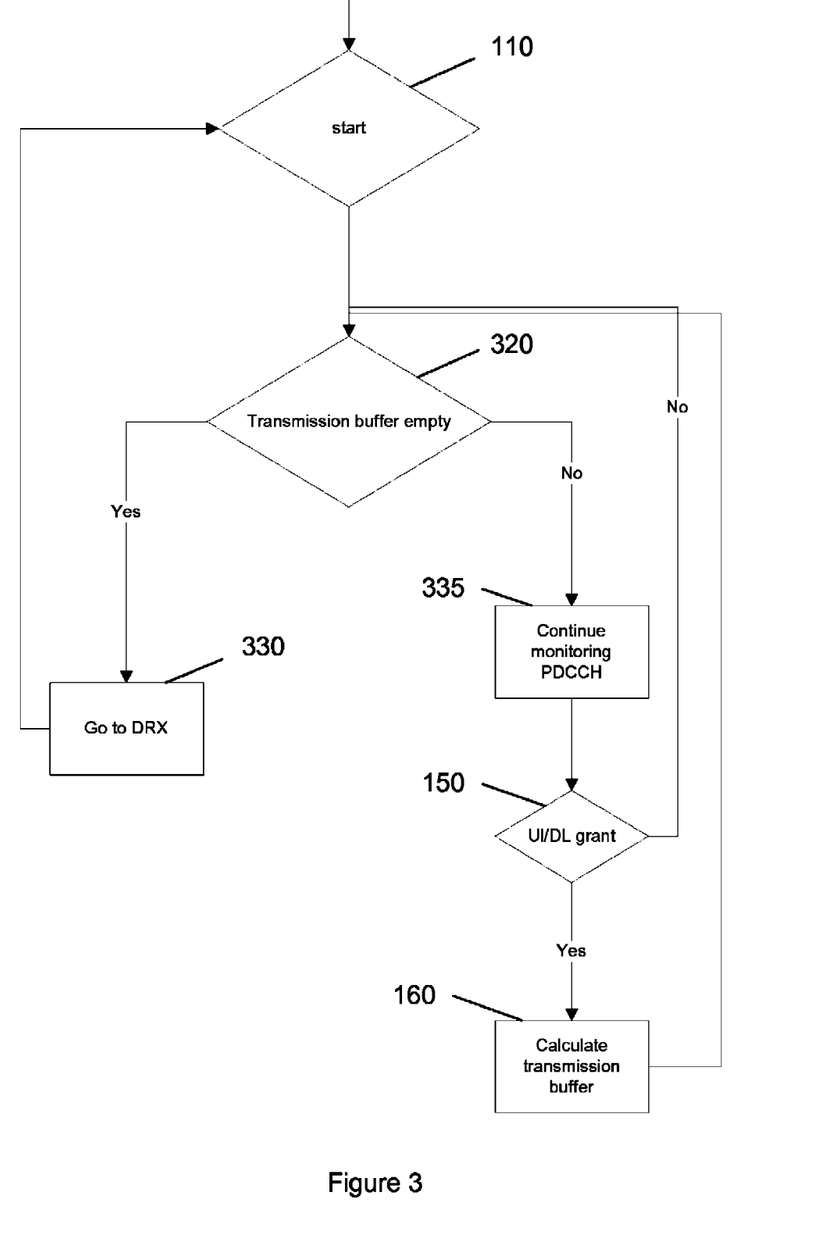
FIG. 3 illustrates a method according to certain embodiments in which a single set of discontinuous reception parameters and instantaneous buffer status report information is used.

In yet another embodiment, a user equipment continues to monitor the PDCCH based on the instantaneous buffer status information. For example, the user equipment stops monitoring the PDCCH for a certain duration (for example, until the next DRX cycle starts) if the buffer status is empty. Here the buffer status refers to the buffer of user equipment and/or eNB. Moreover, the PDCCH monitoring can be based on eNB buffer information shared between the eNB and UE using a DL BSR in addition to eNB and UE buffer. FIG. 3 illustrates a method according to certain embodiments, in which a user equipment can discontinue downlink channel monitoring in certain conditions.

In FIG. 3, at 320, the user equipment may determine whether a transmission buffer in user equipment and/or eNB is empty based, for example, on a buffer status report. This transmission buffer can be a combined transmission buffer based on UE buffered data for transmission and data buffered in eNB/network for transmission to UE. If the transmission buffer is empty, the user equipment may go to discontinuous reception at 330. Otherwise, at 335, the user equipment may continue monitoring PDCCH.

At a suitable time 150, the user equipment can determine whether an uplink (UL)/downlink (DL) assignment has been made. If so, then at 160 after transmitted data is acknowledged, the user equipment can calculate a transmission buffer and then return to checking whether the transmission buffer is empty at 320. If there is no uplink (UL)/downlink (DL) assignment, then the user equipment can continue directly to determining whether the transmission buffer is empty.

The buffer status report can hold information concerning the amount of data pending to be transmitted between the user equipment and the eNB. In certain embodiments it can hold information on user equipment status only, eNB status only, or status information from both user equipment and eNB combined or separately—as examples. Buffer status report holding information concerning eNB buffer is transmitted from eNB to user equipment. Buffer status report holding information concerning user equipment buffer is transmitted from user equipment to eNB. Besides explicit indication in a buffer status report, the information about the buffer status can be updated based on successful data transmission and reception.

This can be combined with a back-off timer on the user equipment side. This timer can ensure that the user equipment can cease PDCCH monitoring after a given time of monitoring without being allocated for new data transmissions. For example, even though the data buffers have been indicated as not being empty, PDCCH can cease being monitored. This timer can be left out from the specified procedure and can be left for user equipment implementation.

Optionally, the user equipment can independently update the stored downlink buffer status information based on knowledge of successful transmissions without further buffer status report signaling. The eNB can update the uplink buffer status information similarly without user equipment signaling a buffer status report. For example, when transmission of N bytes of data is correctly received, the buffer size can be updated to have N bytes less. The buffer status report may have a limited accuracy, such as 16507<Buffer size<=19325 bytes. Thus, the other side may not know the exact size of the buffer. The transition between the PDCCH monitoring states/parameters can be based on updating, for example, the lower (and/or the upper) limit of the corresponding buffer size level of a buffer status report, so that both user equipment and eNB know independently the parameters to follow based on these limits.

A new buffer status report can be transmitted at appropriate times. For example, a new buffer status report can be transmitted when the buffer changes so significantly that the change has impact on the PDCCH monitoring, which can be referred to as condition 1, and the eNB or user equipment wants that implied change to take effect, which can be referred to as condition 2. Of course, if there is enough room in the padding bits for a buffer status report, it can be transmitted also if conditions 1 and 2 do not hold.

Condition 1 may mean, for example, that if the eNB sends the user equipment a downlink buffer status report indicating the buffer size to be 1 MB, it does not need to update it immediately if another 100 kB arrive to the buffer, because that will not affect the monitoring rules, at least not immediately. Condition 2 on the other hand, may mean that the increase in eNB DL buffer size is so small that it does not really benefit from change in discontinuous reception, for example, 100 kB more data to a buffer of 1 MB.

The buffer status report information sent related to the functionality of the PDCCH monitoring may be, in a particularly embodiment, basically a message indicating 'empty BSR' indication from the user equipment and/or eNB.

Certain embodiments, therefore, may avoid relying on the predictability of data flow and avoid building on assumptions of data flow from applications. Thus, certain embodiments may avoid a need for user equipment vendor specific solutions.

Figure 4:
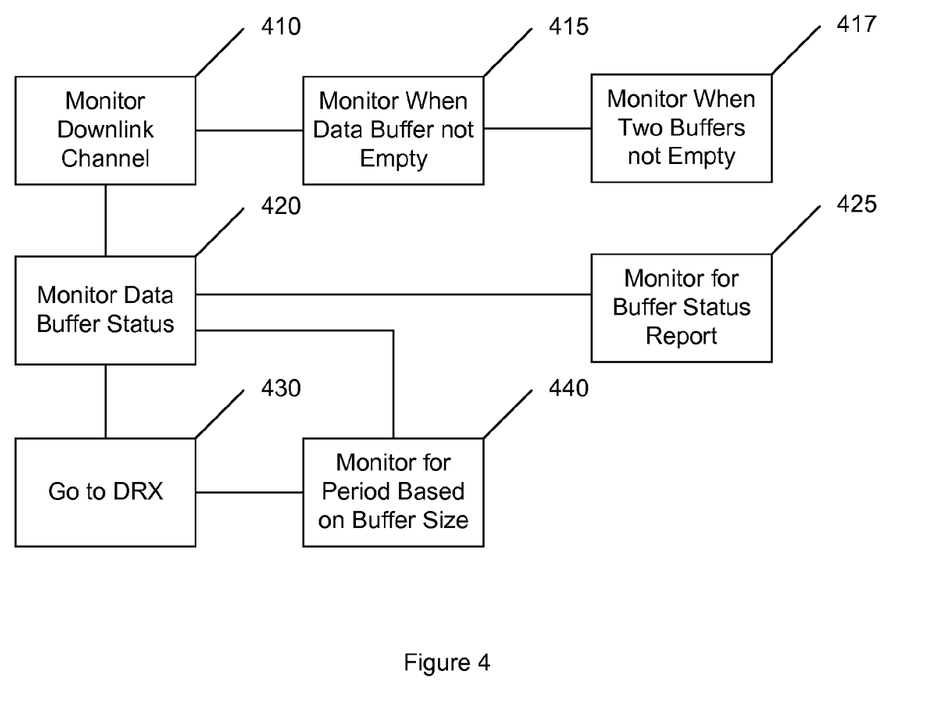
FIG. 4 illustrates a method according to certain embodiments.

FIG. 4 illustrates a method according to certain embodiments. The method can be performed by a user equipment or network element, such as a base station, or eNode B (eNB). As shown in FIG. 4, the method can include, at 410, monitoring a downlink channel, for example a PDCCH, in active time. The method can also include, at 420, monitoring an instantaneous status of a data buffer related to a user equipment. The monitoring of the downlink channel can be guided by the instantaneous status as presently known.

More particularly the monitoring of the instantaneous status can include, at 425, monitoring for a buffer status report. Likewise, the monitoring the downlink channel can include, at 415, monitoring the downlink channel only when the data buffer is not empty. Indeed, the monitoring of the downlink channel can include, at 417, monitoring the downlink channel only when the data buffer is not empty and a second data buffer related to the user equipment is also not empty.

At 430, the method can include following a discontinuous reception (DRX) on-duration after completing the monitoring of the downlink channel Moreover, at 440, a monitoring length of the monitoring of the downlink channel can be based on a quantity of data in the data buffer. The monitoring length can include an on-duration timer or inactivity timer.

Figure 5:
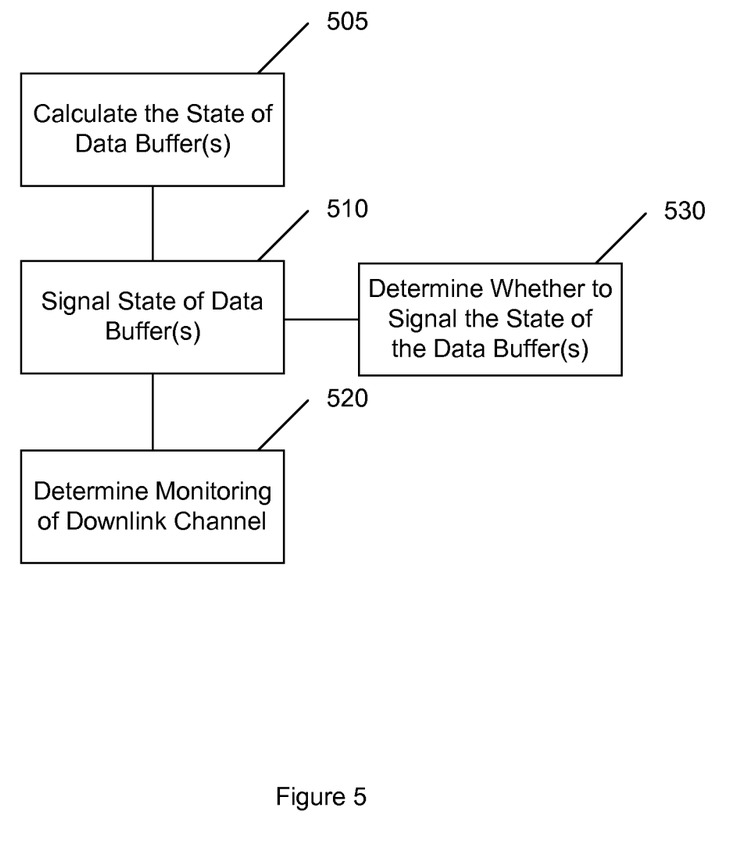
FIG. 5 illustrates another method according to certain embodiments.

FIG. 5 illustrates another method according to certain embodiments. As shown in FIG. 5, a method can include, at 510, signaling an instantaneous status of a user equipment data buffer to a network device. The signaling the instantaneous state can include signaling the instantaneous state in a buffer status report. The instantaneous status can be configured to permit the network device, at 520, to determine monitoring of a downlink channel in active time guided by the instantaneous status as presently known. Moreover, the method can include, at 505, calculating the instantaneous state of the data buffer. The method also includes, at 530, determine whether to signal the state of the data buffer. For example, signaling the instantaneous status can be performed when there is a significant change in the buffer status or when synchronization of the buffer status is desired.

Figure 6:
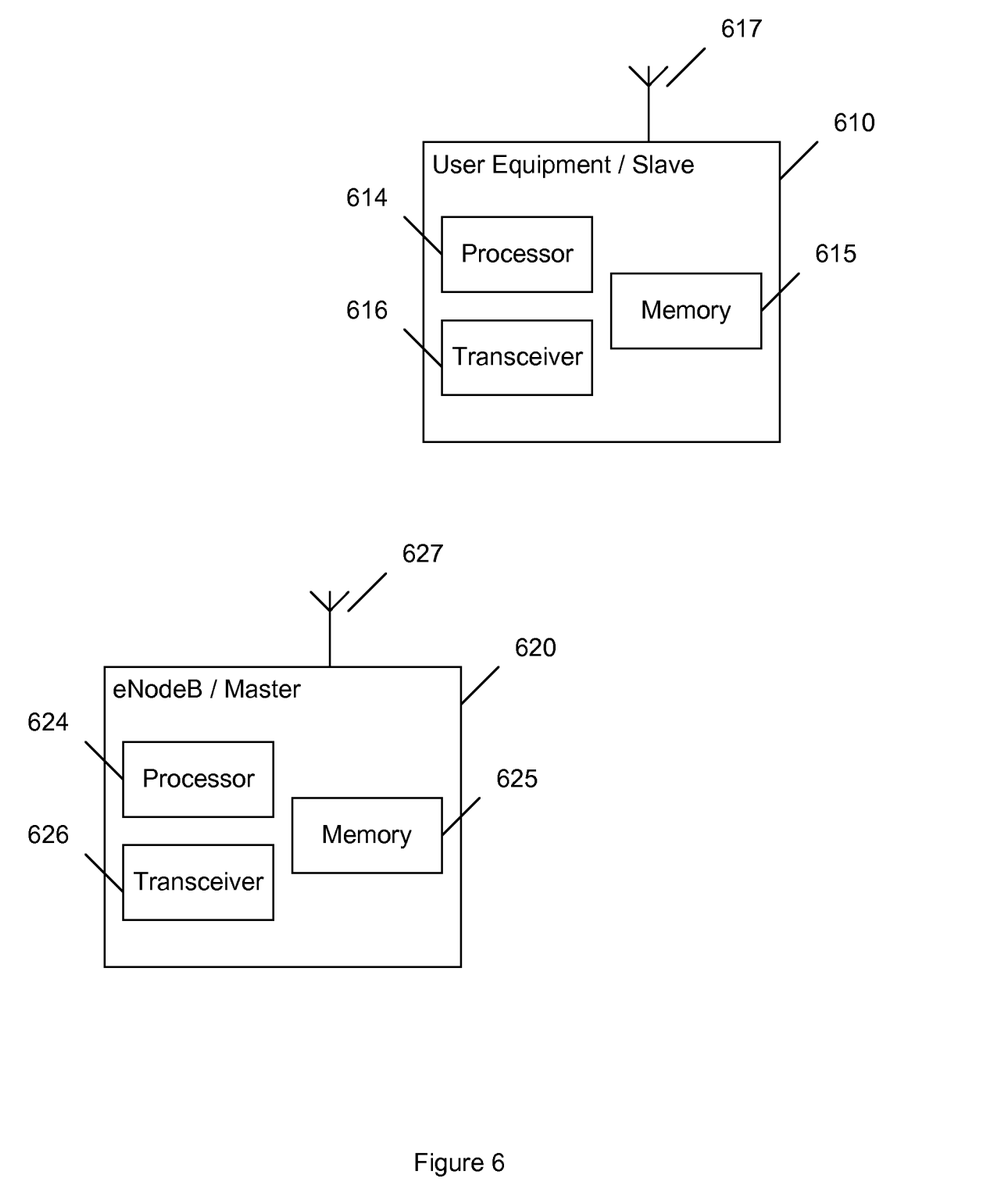
FIG. 6 illustrates a system according to certain embodiments.

FIG. 6 illustrates a system according to certain embodiments. In an example embodiment, a system may include two devices, user equipment (UE) 610 and eNodeB 620. In an alternative embodiment device 610 can be a slave and device 620 can be the master. Each of the devices 610 and 620 may be equipped with at least one processor (respectively 614 and 624), at least one memory (respectively 615 and 625) (including computer program instructions or code), a transceiver (respectively 616 and 626), and an antenna (respectively 617 and 627). There is no requirement that each of these devices be so equipped. For example, the eNodeB 620 may be equipped for wired communication with a core network (not shown).

The transceiver (respectively 616 and 626) can be a transmitter, a receiver, both a transmitter and a receiver, or a unit that is configured both for transmission and reception. The transceiver (respectively 616 and 626) can be coupled to corresponding one or more antenna(s) (respectively 617 and 627), which may include a directional antenna.

The at least one processor (respectively 614 and 624) can be variously embodied by any computational or data processing device, such as a central processing unit (CPU) or application specific integrated circuit (ASIC). The at least one processor (respectively 614 and 624) can be implemented as one or a plurality of controllers.

The at least one memory (respectively 615 and 625) can be any suitable storage device, such as a non-transitory computer-readable medium. For example, a hard disk drive (HDD) or random access memory (RAM) can be used in the at least one memory (respectively 615 and 625). The at least one memory (respectively 615 and 625) can be on a same chip as the corresponding at least one processor (respectively 614 and 624), or may be separate from the corresponding at least one processor (respectively 614 and 624).

The computer program instructions may be any suitable form of computer program code. For example, the computer program instructions may be a compiled or interpreted computer program.

The at least one memory (respectively 615 and 625) and computer program instructions can be configured to, with the at least one processor (respectively 614 and 624), cause a hardware apparatus (for example, user equipment 610 or eNodeB 620) to perform a process, such as any of the processes described herein (see, for example, FIGS. 1-5 and 7).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of user equipment 610 and eNodeB 620 can include a user interface that is operable connected to the processor (respectively 614 and 624) and memory (respectively 615 and 625). That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that the devices include a user interface. For example, the eNodeB 620 may be embodied in part as a rack-mounted computer.

Figure 7:
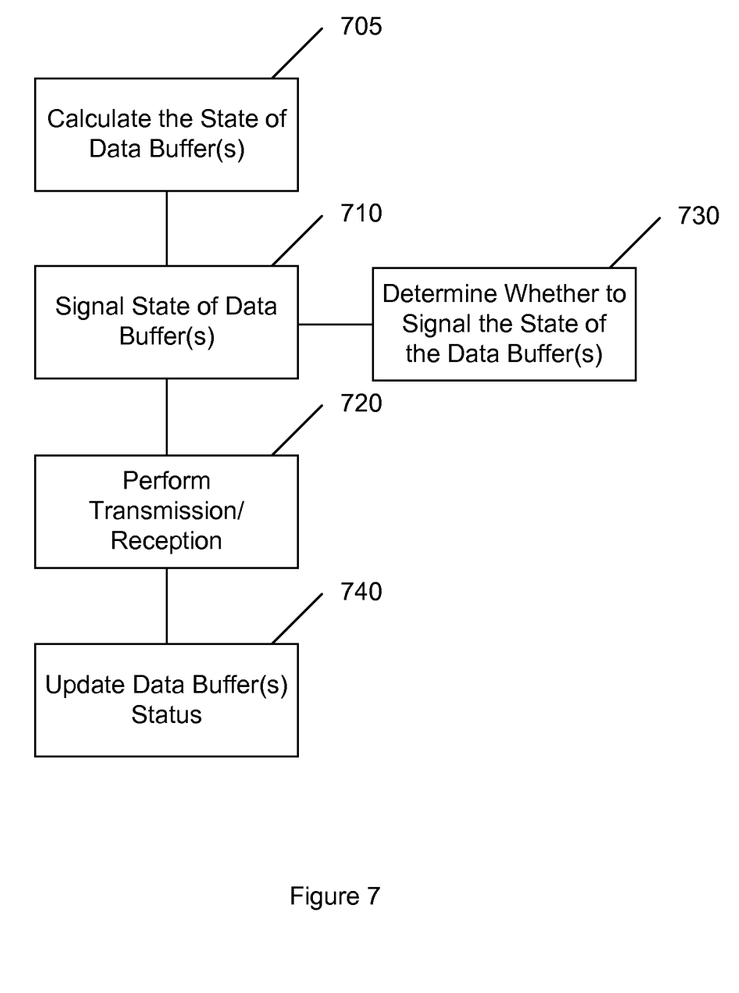
FIG. 7 illustrates a further method according to certain embodiments.

FIG. 7 illustrates a further method according to certain embodiments. As shown in FIG. 7, a method can include, at 710, signaling an instantaneous status of a network device data buffer to a user equipment. The signaling the instantaneous state can include signaling the instantaneous state in a buffer status report. The instantaneous status can be configured to permit a user equipment to configure monitoring of a downlink channel in active time guided by the instantaneous status as presently known, optionally in combination with an instantaneous status of a user equipment's own buffer status. Moreover, the method can include, at 705, calculating the instantaneous state of the data buffer. The method also includes, at 730, determining whether to signal the state of the data buffer. For example, signaling the instantaneous status can be performed when there is a significant change in the buffer status or when synchronization of the buffer status is desired.

The method also includes, at 720, performing transmission and reception of data with the user equipment. This transmission/reception of data can implicitly update a previously provided buffer status report. Furthermore, the method can include, at 740, explicitly updating a data buffer status. The update can be provided in absolute terms or relative to a previously transmitted buffer status report. Buffer status reports are simply one way that the buffer status can be transmitted, but other ways are also permitted.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Glossary of Abbreviations

UE user equipment
PDCCH physical downlink control channel
UL uplink
DL downlink
DRX discontinuous reception
BSR buffer status report
eNB E-UTRAN nodeB
E-UTRAN evolved universal terrestrial radio access network
MAC medium access control

We claim:

1. A method, comprising:
monitoring, by a user equipment, a downlink channel in active time or connected mode;
monitoring, by the user equipment, an instantaneous status of data buffers related to the user equipment and a base station; and
adjusting power settings, by the user equipment, based on the instantaneous status as presently known in comparison to a threshold to change the monitoring of the downlink channel,
wherein the monitoring the instantaneous status of the data buffer related to the base station comprises receiving the instantaneous status of the data buffer of the base station in a buffer status report.

2. The method of claim 1, wherein the monitoring the downlink channel comprises monitoring the downlink channel when the data buffers are not empty.

3. The method of claim 1, wherein the monitoring the downlink channel comprises switching to less frequent monitoring of the downlink channel when the data buffers are empty.

4. The method of claim 1, further comprising:
following a discontinuous reception on-duration after completing the monitoring of the downlink channel.

5. The method of claim 1, wherein a monitoring length of the monitoring of the downlink channel is based on a quantity of data in the data buffers.

6. The method of claim 5, wherein the monitoring length includes an on-duration timer or inactivity timer.

7. The method of claim 1, wherein a monitoring length of the monitoring of the downlink channel is longer when the instantaneous status of the data buffer related to the user equipment or the base station exceeds a threshold indicative of a large amount of data.

8. The method of claim 1, further comprising,
using a back-off timer and ceasing the monitoring after a given time of monitoring without being allocated for new data transmissions.

9. A user equipment, comprising:
at least one processor, a transceiver; and
at least one memory including computer program code,
wherein the at least one memory and computer program code are configured to, with the at least one processor, cause the user equipment at least to
monitor a downlink channel in active time or connected mode; and
monitor an instantaneous status of data buffers related to the user equipment and a base station; and
adjust power saving settings based on the instantaneous status as presently known in comparison to a threshold to change the monitoring of the downlink channel,
wherein the monitoring the instantaneous status of the data buffer related to the base station comprises receiving the instantaneous status of the data buffer of the base station in a buffer status report.

10. The user equipment of claim 9, wherein the at least one memory and computer program code are configured to, with the at least one processor, cause the user equipment at least to monitor the downlink channel by switching to less frequent monitoring of the downlink channel when the data buffers are empty.

11. The user equipment of claim 9, wherein the at least one memory and computer program code are configured to, with the at least one processor, cause the user equipment at least to monitor the downlink channel by monitoring the downlink channel when the data buffers are not empty.

12. The user equipment of claim 9, wherein the at least one memory and computer program code are configured to, with the at least one processor, cause the user equipment at least to follow a discontinuous reception on-duration after completing the monitoring of the downlink channel.

13. The user equipment of claim 9, wherein a monitoring length of the monitoring of the downlink channel is based on a quantity of data in the data buffers.

14. The user equipment of claim 13, wherein the monitoring length comprises an on-duration timer or inactivity timer.

15. The user equipment of claim 9, wherein a monitoring length of the monitoring of the downlink channel is longer when the instantaneous status of the data buffer related to the user equipment or the base station exceeds a threshold indicative of a large amount of data.

16. The user equipment of claim 9, wherein the at least one memory and computer program code are configured to, with the at least one processor, cause the user equipment at least to use a back-off timer and cease the monitoring after a given time of monitoring without being allocated for new data transmissions.

17. An apparatus, comprising:
at least one processor; and
at least one memory including computer program code, wherein the at least one memory and computer program code are configured to, with the at least one processor, cause the apparatus to at least:

signal an instantaneous status of a data buffer of a network device in a buffer status report to a user equipment;

configuring, by the signaling, the user equipment to adjust power setting for the user equipment to change monitoring of a downlink channel in active time or connected mode based on the instantaneous status as presently known at the user equipment in comparison to a threshold.

18. The apparatus of claim 17, wherein the at least one memory and computer program code are configured to, with the at least one processor, cause the apparatus at least to calculate the instantaneous state.

19. The apparatus of claim 17, wherein the at least one memory and computer program code are configured to, with the at least one processor, cause the apparatus at least to signal the instantaneous state in a buffer status report.

20. The apparatus of claim 17, wherein the at least one memory and computer program code are configured to, with the at least one processor, cause the apparatus at least to signal the instantaneous status when there is a significant change in the buffer status or when synchronization of the buffer status is desired.

* * * * *